United States Patent
Jones et al.

(10) Patent No.: US 11,142,648 B2
(45) Date of Patent: Oct. 12, 2021

(54) PARTICLE SURFACE TREATMENT

(71) Applicant: HUNTSMAN P&A UK LIMITED, Stockton-On-Tees (GB)

(72) Inventors: Anthony G. Jones, Stockton-On-Tees (GB); David Williamson, Bishop Auckland (GB); Peter Costello, Stockton-On-Tees (GB); John L. Edwards, Stockton-On-Tees (GB)

(73) Assignee: HUNTSMAN P&A UK LIMITED, Stockton-On-Tees (GB)

( * ) Notice: Subject to any disclaimer, the term of this patent is extended or adjusted under 35 U.S.C. 154(b) by 415 days.

(21) Appl. No.: 15/764,339

(22) PCT Filed: Sep. 23, 2016

(86) PCT No.: PCT/GB2016/052963
§ 371 (c)(1),
(2) Date: Mar. 29, 2018

(87) PCT Pub. No.: WO2017/055814
PCT Pub. Date: Apr. 6, 2017

(65) Prior Publication Data
US 2018/0298197 A1 Oct. 18, 2018

(30) Foreign Application Priority Data

Oct. 2, 2015 (GB) ..................................... 1517478

(51) Int. Cl.
C09C 1/36 (2006.01)
C08K 9/02 (2006.01)
C08J 3/20 (2006.01)
C08K 9/04 (2006.01)
C08K 3/22 (2006.01)

(52) U.S. Cl.
CPC ............ *C09C 1/3692* (2013.01); *C08J 3/203* (2013.01); *C08K 9/02* (2013.01); *C08K 9/04* (2013.01); *C09C 1/3615* (2013.01); *C09C 1/3661* (2013.01); *C09C 1/3669* (2013.01); *C01P 2004/61* (2013.01); *C01P 2004/62* (2013.01); *C01P 2004/64* (2013.01); *C08J 2323/06* (2013.01); *C08K 3/22* (2013.01); *C08K 2003/2241* (2013.01)

(58) Field of Classification Search
CPC ... C09C 1/3661; C09C 1/3692; C09C 1/0084; C09C 1/3615; C08J 3/203; C08K 9/02; C08K 2003/2241; C01P 2004/61
USPC ....................................................... 264/175
See application file for complete search history.

(56) References Cited

U.S. PATENT DOCUMENTS

| | | | | |
|---|---|---|---|---|
| 4,183,768 A | * | 1/1980 | Knapp .................. | C09C 1/3661 106/441 |
| 5,520,340 A | | 5/1996 | Kröckert et al. | |
| 5,567,754 A | | 10/1996 | Stramel | |
| 5,837,049 A | * | 11/1998 | Watson .................. | B82Y 30/00 106/427 |
| 6,395,081 B1 | * | 5/2002 | Hiew .................... | C09C 1/3653 106/442 |
| 7,138,010 B1 | * | 11/2006 | El-Shoubary .......... | B82Y 30/00 106/448 |
| 7,238,231 B1 | | 7/2007 | Craig et al. | |
| 7,387,795 B2 | | 6/2008 | Hollenberg et al. | |
| 2002/0099126 A1 | | 7/2002 | El-Shoubary et al. | |
| 2004/0265507 A1 | | 12/2004 | Xiong et al. | |
| 2005/0027038 A1 | * | 2/2005 | El-Shoubary ............ | C08K 9/04 523/210 |
| 2005/0228112 A1 | | 10/2005 | Takahashi et al. | |
| 2005/0239921 A1 | | 10/2005 | Birmingham et al. | |
| 2008/0152914 A1 | | 6/2008 | Kostelnik et al. | |
| 2008/0271642 A1 | | 11/2008 | Craig et al. | |
| 2011/0041726 A1 | | 2/2011 | Robb et al. | |

(Continued)

FOREIGN PATENT DOCUMENTS

| | | | |
|---|---|---|---|
| CN | 1123808 A | 6/1996 | |
| CN | 1144233 A | 3/1997 | |

(Continued)

OTHER PUBLICATIONS

Ramos, Alfeu & Nunes, Carlos. (1999). The Effect of Excess Aluminum on the Composition and Microstructure of Nb—Al Alloys Produced by Aluminothermic Reduction of Nb 2 O 5. Journal of Materials Synthesis and Processing—J Mater Synth Process. 7. 297-301. 10.1023/A:1021873020993. (Year: 1999).*

(Continued)

*Primary Examiner* — Leith S Shafi
*Assistant Examiner* — Edgaredmanuel Troche
(74) *Attorney, Agent, or Firm* — Norman B. Thot

(57) ABSTRACT

A method of treating particulate titanium dioxide includes providing the particulate titanium dioxide which includes a crystal structure and then treating the particulate titanium dioxide with a coating agent that is an alkylphosphonic acid or an ester thereof, and steam micronizing the particulate titanium dioxide with a steam micronizer so that a vapor exit temperature from the steam micronizer is 150° C. or higher, so as to obtain a micronized particulate titanium dioxide which includes the coating agent at an outer surface. The particulate titanium dioxide includes an aluminum oxide coating and/or includes within the crystal structure aluminum oxide in a molar excess of an amount required to compensate any $Nb_2O_5$ in the crystal structure. The alkylphosphonic acid includes a $C_6$-$C_{22}$ alkyl group.

17 Claims, No Drawings

(56) References Cited

U.S. PATENT DOCUMENTS

| | | |
|---|---|---|
| 2011/0144251 A1 | 6/2011 | El-Shoubary |
| 2012/0308667 A1 | 12/2012 | Melson et al. |
| 2013/0011350 A1 | 1/2013 | Beck et al. |
| 2013/0040130 A1 | 2/2013 | Burniston et al. |
| 2013/0161856 A1 | 6/2013 | Panjnani et al. |
| 2014/0343212 A1* | 11/2014 | Diebold ............ C08K 3/105 524/437 |
| 2015/0274936 A1 | 10/2015 | Endtner et al. |
| 2015/0337138 A1 | 11/2015 | Vanhecke et al. |
| 2017/0002181 A1 | 1/2017 | Lehmann et al. |
| 2017/0066924 A1 | 3/2017 | Fritzen et al. |
| 2017/0107117 A1 | 4/2017 | Takemoto et al. |

FOREIGN PATENT DOCUMENTS

| | | |
|---|---|---|
| CN | 1265691 A | 9/2000 |
| CN | 1430653 A | 7/2003 |
| CN | 1681894 A | 10/2005 |
| CN | 1809654 A | 7/2006 |
| CN | 1839178 A | 9/2006 |
| CN | 101589115 A | 11/2009 |
| CN | 101610903 A | 12/2009 |
| CN | 101675119 A | 3/2010 |
| CN | 102695761 A | 9/2012 |
| CN | 102741359 A | 10/2012 |
| CN | 103814090 A | 5/2014 |
| CN | 103842588 A | 6/2014 |
| DE | 197 51 857 A1 | 5/1999 |
| EP | 1 034 217 B1 | 9/2000 |
| EP | 1 591 490 A2 | 11/2005 |
| JP | 08-176460 A | 7/1996 |
| JP | H09-278442 A | 10/1997 |
| JP | 2001-524567 A | 12/2001 |
| JP | 2003-41109 A | 2/2003 |
| JP | 2003-335979 A | 11/2003 |
| JP | 2005-314701 A | 11/2005 |
| JP | 2006-176566 A | 7/2006 |
| JP | 2006-225452 A | 8/2006 |
| JP | 2007-501309 A | 1/2007 |
| JP | 2007-224307 A | 9/2007 |
| JP | 2010-132785 A | 6/2010 |
| JP | 2011-522910 A | 8/2011 |
| JP | 2014-1406 A | 1/2014 |
| JP | 2015-187268 A | 10/2015 |
| JP | 2016-1591 A | 1/2016 |
| JP | 2016-506421 A | 3/2016 |
| WO | WO 2011/116870 A1 | 9/2011 |
| WO | WO 2015/091041 A1 | 6/2015 |
| WO | WO 2015/135536 A2 | 9/2015 |

OTHER PUBLICATIONS

ASTM D1208: "Standard Test Methods for Common Properties of Certain Pigments", Designation: D 1208-96, pp. 1-3 (2002).

ASTM D281: "Standard Test Method for Oil Absorption of Pigments by Spatula Rub-out", Designation: D 281-12, pp. 1-2 (2016).

* cited by examiner

PARTICLE SURFACE TREATMENT

CROSS REFERENCE TO PRIOR APPLICATIONS

This application is a U.S. National Phase application under 35 U.S.C. § 371 of International Application No. PCT/GB2016/052963, filed on Sep. 23, 2016 and which claims benefit to Great Britain Patent Application No. 1517478.2, filed on Oct. 2, 2015. The International Application was published in English on Apr. 6, 2017 as WO 2017/055814 A1 under PCT Article 21(2).

FIELD

The present invention relates to methods for the production of titanium dioxide particulate solids treated with a coating material. The method of the present invention allows more of the coating materials to be attached and/or the coating material to be more fully attached onto the surface of the particles. The treated titanium dioxide particles are particularly useful for use in polymer compositions, such as masterbatches.

BACKGROUND

The addition of solid particulate additives, in particular inorganic fillers and pigments, to organic materials, especially polymers, is known to improve the properties thereof, as well as having benefits in terms of reducing the overall cost of the product. In the production of polymer compositions that include such solid additives it is important to ensure that the additive and the polymer are efficiently mixed in an economical process. Frequently, this is achieved by prior surface treatment of the additive particles. Coated particles, such as coated fillers and pigments, tend to have enhanced processability, improved dispersability and can provide superior stability and resistance to degradation. In particular, the tendency of some solid additives to react with polymers, causing premature destruction of polymer compositions or masterbatches or articles formed therefrom, can be reduced by prior surface treatment.

Processes for coating the surface of inorganic particles with organophosphorus compounds are known in the art.

For example, U.S. Pat. No. 5,837,049 describes a treated inorganic solid that comprises particles of inorganic material which are coated with an alkylphosphonic acid or ester thereof, the alkylphosphonic acid containing 6 to 22 carbon atoms. The particulate material is usually a pigment, extender or filler which is treated by mixing with the alkylphosphonic acid or ester, for example in an aqueous dispersion or during a process step such as milling. The treated inorganic solid is stated as being useful for preparing polymer compositions such as masterbatches.

U.S. Pat. No. 7,387,795 describes cosmetic compositions which are prepared with pigments that have been surface treated with organophosphonic acids. These pigments can be optionally pre-treated with appropriate acidic or basic solutions prior to treatment with the organophosphonic acid compound. Furthermore, the pigments can be optionally co-treated with other compounds for the purpose of imparting additional functionality or utility to the resultant particle surfaces. Such co-treatments can include but are not limited to organosilanes, carboxylic acids and their salts, titanates, zirconoates, organoaluminum compounds, aluminum salts, aluminum trichloride, aluminum trihydrate, azole and imidazole compounds, etc. These optional co-treatments can be applied either before the application, after the application, or in combination with the application of the organophosphonic acid surface treatments.

US 2013/0011350 describes metal oxide particles and/or metal hydroxide particles, aftertreated with an organic phosphorus compound selected from the group of the hydroxyalkyldiphosphonic acids or salts thereof, alkylphosphonic acids, which may be substituted by at least one COOH group, or salts thereof, aminoalkylenephosphonic acids or salts thereof, or organic phosphoric acid esters or salts thereof. Before aftertreatment with the organic phosphorus compound, the base particles may have been provided with at least one further coating, which comprises, for example, metal oxides or hydroxides of silicon, titanium, zinc, aluminum, cerium, iron, yttrium, manganese or zirconium, where the metal is preferably selected differently to the metal of the base particle. These particles are described for use in compositions for topical application which comprise, in particular, the self-tanning agent dihydroxyacetone. It is stated that the inclusion of the particles serves to reduce or prevent the degradation of the dihydroxyacetone in cosmetic formulations.

SUMMARY

An aspect of the present invention is to provide solid particulate additives that provide an increased melt flow index when incorporated into a polymer composition and that can be used as fillers or pigments in polyolefin masterbatching or engineering polymer compounding. The solid particulate additives should thereby give rise to a low evolution of volatiles, e.g., as measured by lacing, when incorporated into a polymer composition.

In an embodiment, the present invention provides a method of treating particulate titanium dioxide which includes providing the particulate titanium dioxide comprising a crystal structure and then treating the particulate titanium dioxide with a coating agent that is an alkylphosphonic acid or an ester thereof, and steam micronizing the particulate titanium dioxide with a steam micronizer so that a vapor exit temperature from the steam micronizer is 150° C. or higher, so as to obtain a micronized particulate titanium dioxide which comprises the coating agent at an outer surface. The particulate titanium dioxide comprises an aluminum oxide coating and/or comprises within the crystal structure aluminum oxide in a molar excess of an amount required to compensate any $Nb_2O_5$ in the crystal structure. The alkylphosphonic acid comprises a $C_6$-$C_{22}$ alkyl group.

DETAILED DESCRIPTION

The present invention provides, in a first embodiment, a method of treating particulate titanium dioxide, the method comprising:

i) providing particulate titanium dioxide, wherein the particulate titanium dioxide is coated with aluminum oxide, and/or includes within its crystal structure aluminum oxide in molar excess of the amount required to compensate any $Nb_2O_5$ in said crystal structure; and then ii) treating the particulate titanium dioxide with a coating agent that is an alkylphosphonic acid or ester thereof, wherein the alkylphosphonic acid has a C6-C22 alkyl group, and steam micronizing the particulate titanium dioxide, wherein the vapor exit temperature from the steam micronizer is 150° C. or higher, so as to obtain a micronized particulate titanium dioxide that is provided with coating agent at its outer surface.

As the skilled person would appreciate, x-ray fluorescence spectroscopy can be used as a technique to measure the concentrations of $Al_2O_3$ and $Nb_2O_5$ in particulate titanium dioxide. Therefore, to determine whether the particulate titanium dioxide material provided in step i) includes within its crystal structure aluminum oxide in excess of the amount required to compensate any $Nb_2O_5$ in said crystal structure on a molar basis, the amounts of $Al_2O_3$ and $Nb_2O_5$ are first measured by x-ray fluorescence. It is then calculated whether the molar amount of $Al_2O_3$ is equal to the amount required to compensate for the molar amount of $Nb_2O_5$ that is present, or whether it is in excess of this. The excess is the amount of $Al_2O_3$ above that which is needed to have the same number of moles of Al atoms as Nb atoms in the particulate titanium dioxide sample. This excess alumina in the particulate titanium dioxide sample is then expressed as an amount of $Al_2O_3$ on a weight percentage basis with respect to $TiO_2$.

The skilled person will be aware that titania as formed by the chloride process will normally have less than 0.01 wt % $Nb_2O_5$, whilst for titania as formed by the sulfate process the amount of $Nb_2O_5$ can vary depending on the ore used, but it can be as low as less than 0.01 wt % $Nb_2O_5$. For materials where substantially zero $Al_2O_3$ is needed to compensate $Nb_2O_5$; because there is substantially no $Nb_2O_5$, the values for the total amount of $Al_2O_3$ in the crystal by weight and the amount of excess $Al_2O_3$ are substantially identical, because all $Al_2O_3$ in the crystal is "excess".

In step ii), the treatment with the coating agent may be applied before and/or during the micronization of the particulate inorganic solids with the steam micronizer. Thus the treatment with the coating agent may be completed before the micronization occurs, or the treatment with the coating agent may have been started before the micronization occurs but continues during some or all of the micronization, or treatment with the coating agent may not have started before the micronization occurs, and only occurs during some or all of the micronization.

Surprisingly, the method of the present invention results in the attachment of an increased amount of the coating agent.

The particulate titanium dioxide as provided in step i) can, for example, have a pH of from 5 to 9. The pH of the titania can be measured using ASTM D1208. Suitable levels of coating with alumina and/or suitable levels of excess alumina in the crystal structure of the titania can be used to achieve these pH levels. These levels are discussed further below. It is significant that in the present invention these pH levels are used, as this assists with achieving higher levels of coating agent attachment.

The treated particulate titanium dioxide as obtained by the method can be used as filler or pigment in polymer compositions, including polyolefin masterbatching or engineering polymer compounding. The treated particulate titanium dioxide as obtained by the method can give rise to an increased melt flow index when incorporated into a polymer composition.

The method of the present invention may be used to obtain a treated particulate titanium dioxide that has beneficial properties when used as a filler or pigment in a polymer composition, such as good dispersability, increased hydrophobicity and/or higher bulk density for the particulate titanium dioxide and/or improved melt flow index for the composition.

In one embodiment, step i) involves providing particulate titanium dioxide, wherein the particulate titanium dioxide includes within its crystal structure aluminum oxide in molar excess of the amount required to compensate $Nb_2O_5$. By providing the material within the crystal structure, it is not necessary to coat the particles before applying the coating agent. Accordingly, in one embodiment there is no alumina coating provided on the particulate titanium dioxide. This is beneficial in that it allows a wet treatment step to be omitted from the production technique.

Having no $Al_2O_3$ coating gives lower evolution of volatiles. Thus this embodiment is beneficial in that not only are higher levels of coating agent attached, but additionally the treated particulate titanium dioxide as obtained can give rise to a low evolution of volatiles, e.g., as measured by lacing, when incorporated into a polymer composition.

In addition, this embodiment of the method has the advantages of eliminating the energy consuming operations of: wet treatment to apply the alumina coating, filtration, washing, and drying. These steps would normally be included in a method involving preparing titania particles, where a coating of alumina or silica or the like is conventionally applied. Surprisingly, it has been determined that this coating step is not required. Not only does the energy requirement diminish by omitting these operations, but the process is simplified.

In one such embodiment, step ii) is carried out such that treatment with the coating agent does not start before the micronization occurs, and only occurs during some or all of the micronization. Thus the coating agent is added in a steam micronizer with a vapor exit temperature of 150° C. or more. This removes the need for any wet treatment steps within the method.

In a second embodiment, the present invention provides treated particulate titanium dioxide as obtainable by carrying out the method of the first embodiment.

The treated particulate titanium dioxide of the present invention is distinguishable from the treated particulate titanium dioxide obtained in the prior art, because an increased amount of the coating agent is attached by the treatment method.

As the skilled person would appreciate, it is possible to use $^{31}P$ solid state NMR studies to assess the extent of attachment of the coating agent to the surface of the $TiO_2$ particle following the treatment process. In these studies the reduction of the free acid peak of phosphonic acid at 37 ppm disappears as the level of coating attachment is increased. Thus a minimal or zero free acid peak of phosphonic acid at 37 ppm in a $^{31}P$ solid state NMR spectrum indicates that substantially all, or all, of the coating agent has been attached.

In addition, or alternatively, it is possible to determine the amount of coating agent added by evaluating the amount of phosphorus on the coated titania product. The amount of additional phosphorus present in the coated sample, due to the attachment of alkyl phosphonic acid or an ester thereof, can be determined by an elemental analysis technique, such as x-ray fluorescence spectrometry.

In the treated particulate titanium dioxide according to the present invention, the level of alkyl phosphonic acid or ester thereof attached as a coating is suitably greater than 0.1 wt % P on $TiO_2$ (where the P is the phosphorus level in the sample originating from the alkyl phosphonic acid or ester thereof), as determined by x-ray fluorescence analysis. For a $TiO_2$ pigment with a specific surface area of 10 m$^2$/g this would be equivalent to a level of attached alkyl phosphonic acid or ester thereof of greater than $3.2 \times 10^{-6}$ mol/m$^2$.

In one embodiment, therefore, the present invention provides treated particulate titanium dioxide which comprises:

particulate titanium dioxide that is coated with aluminum oxide, and/or includes within its crystal structure aluminum oxide in molar excess of the amount required to compensate any $Nb_2O_5$ in said crystal structure; and coating agent that is an alkylphosphonic acid or ester thereof, wherein the alkylphosphonic acid has a C6-C22 alkyl group, wherein the particulate titanium dioxide is in the form of a micronized particulate titanium dioxide that is provided with said coating agent attached thereto at its outer surface, and wherein the level of coating agent attached is greater than 0.1 wt % P on $TiO_2$ (where the P is the phosphorus level in the sample originating from the coating agent), as determined by x-ray fluorescence analysis.

In one embodiment the level of coating agent attached is 0.15 wt % or more P on $TiO_2$, or 0.2 wt % or more P on $TiO_2$, such as 0.3 wt % or more P on $TiO_2$ or 0.4 wt % or more P on $TiO_2$, or 0.5 wt % or more P on $TiO_2$.

There can, for example be a minimal, or no, free acid peak of phosphonic acid at 37 ppm in a $^{31}P$ solid state NMR spectrum. This indicates that substantially all, or all, of the coating agent has been attached.

In a third embodiment, the present invention provides a method of preparing a polymeric composition, the method comprising:

providing treated particulate titanium dioxide according to the second embodiment; and then mixing the treated particulate titanium dioxide with polymer.

It may be that the step of providing the treated particulate titanium dioxide is achieved by carrying out the method of the first embodiment.

The polymer may be an organic polymer.

In a fourth embodiment, the present invention provides a polymeric composition as obtainable by carrying out the process of the third embodiment. This is therefore a polymeric composition which comprises a mixture of treated particulate titanium dioxide according to the second embodiment together with polymer.

The polymeric composition may be a masterbatch.

In a fifth embodiment, the present invention provides a method of producing a polymer product, the method comprising:

providing a polymeric composition according to the fourth embodiment; and then calendaring or extruding or molding the composition to form a polymer product.

It may be that the step of providing the polymeric composition is achieved by carrying out the method of the third embodiment. In that method of the third embodiment, it may be that the step of providing the treated particulate titanium dioxide is achieved by carrying out the method of the first embodiment.

Thus in one embodiment, the present invention provides a method of producing a polymer product, the method comprising:

a) providing particulate titanium dioxide, wherein the particulate titanium dioxide is coated with aluminum oxide, and/or includes within its crystal structure aluminum oxide in molar excess of the amount required to compensate any $Nb_2O_5$ in said crystal structure; and then b) treating the particulate titanium dioxide with a coating agent that is an alkylphosphonic acid or ester thereof, wherein the alkylphosphonic acid has a C6-C22 alkyl group, and steam micronizing the particulate titanium dioxide, wherein the vapor exit temperature from the steam micronizer is 150° C. or higher, so as to obtain a micronized particulate titanium dioxide that is provided with coating agent at its outer surface;

c) mixing the thus-obtained treated particulate titanium dioxide with polymer; and then d) calendaring or extruding or molding the composition to form a polymer product.

The present invention further provides, in a sixth embodiment, a polymer product as obtainable by carrying out the process of the fifth embodiment.

In one embodiment, the polymer product is a pellet.

In a seventh embodiment, the present invention provides the use of the treated particulate titanium dioxide of the second embodiment to increase the melt flow index of a polymer composition into which the titanium dioxide is incorporated. In one embodiment, the treated particulate titanium dioxide as used has been directly obtained by the process of the first embodiment.

In an eighth embodiment, the present invention provides the use of the treated particulate titanium dioxide of the second embodiment to improve the dispersability, increase the hydrophobicity and/or increase the bulk density of a polymer composition into which the treated titanium dioxide is incorporated. In one embodiment, the treated particulate titanium dioxide as used has been directly obtained by the process of the first embodiment.

In a ninth embodiment, the present invention provides the use of aluminum oxide to increase the amount of coating agent that is attached as a coating to particulate titanium dioxide, wherein the coating agent is an alkylphosphonic acid or ester thereof, wherein the alkylphosphonic acid has a C6-C22 alkyl group, and wherein the aluminum oxide is provided within the crystal structure of the particulate titanium dioxide, in excess of the amount required to compensate any $Nb_2O_5$ in said crystal structure, prior to the coating agent being applied.

In a tenth embodiment, the present invention provides the use of steam micronizing, wherein the vapor exit temperature from the steam micronizer is 150° C. or higher, to increase the amount of coating agent that is attached as a coating to particulate titanium dioxide, wherein the coating agent is an alkylphosphonic acid or ester thereof, wherein the alkylphosphonic acid has a C6-C22 alkyl group, and wherein the coating agent is applied before and/or during micronization of the particulate inorganic solids with the steam micronizer.

The titanium dioxide used in the present invention can be any form of titanium dioxide which is suitable for use in masterbatches or similar polymer compositions. One form of titanium dioxide is included in the composition for the purpose of producing a white composition and/or to improve opacity. This form is generally known as pigmentary titanium dioxide and this may suitably be used in the present invention. However, also included within the scope of the present invention are other forms of titanium dioxide, such as the form of titanium dioxide which is often called "transparent" titanium dioxide on account of the fact that, due to its particle size, the attenuation of visible light is very low. This form of titanium dioxide has a high attenuation for UV light and is therefore added to plastics compositions to provide protection from UV light.

The titanium dioxide can be prepared by any of the well-known processes such as the "sulfate" process or the "chloride" process. In one embodiment, the titanium dioxide has been prepared by the chloride process.

The titanium dioxide may be in the anatase or rutile crystal form; in one embodiment rutile titanium dioxide is used.

In one embodiment, therefore, the titania material is titanium dioxide which is substantially in a rutile crystal habit. Thus, according to one embodiment, greater than 90% by weight of the titanium dioxide, for example, greater than 95% by weight of the titanium dioxide, and, for example, greater than 99% by weight of the titanium dioxide, based on the total weight of the particulate material, is in the rutile crystal habit. The percent of titanium dioxide in the rutile crystal habit may be determined by any known method, for example, by measuring X-ray diffraction patterns. However, in some embodiments the particulate material may comprise titanium dioxide in an anatase crystal form.

In general, the titanium dioxide particles will normally have a particle diameter that is from 0.01 µm to 50 µm. It may be from 0.01 µm to 40 µm, or from 0.05 µm to 30 µm. The particles can, for example, have a diameter of 20 µm or less, such as from 0.05 µm to 20 µm.

The particle size may be determined by laser diffraction and may be measured using a laser diffraction machine, such as those available from Malvern Instruments Ltd, e.g., a MasterSizer machine.

The particle size may alternatively be determined by X-ray sedimentation and may be measured using a X-ray disc centrifuge, such as those available from Brookhaven, e.g., a BI-XDC machine.

One use of the treated titanium dioxide of the present invention is the formation of masterbatch compositions for pigmented or filled plastics. Accordingly, the particle size of the titanium dioxide will normally be such that the treated titanium dioxide material is suitable for this purpose. Normally, the average particle size of the titanium dioxide is in the range of from 0.1 µm to 20 µm.

Where the particles are substantially spherical this size will normally be taken to represent the diameter. However, non-spherical particles can be used and in such cases the size refers to the largest dimension. One suitable product is acicular and has a ratio of largest dimension to shortest dimension of from 8:1 to 2:1.

When the titanium dioxide as used is pigmentary the average particle size is normally in the range of from 0.05 µm to 1 µm, such as from 0.1 µm to 0.5 µm, and, for example, in the range of from 0.2 µm to 0.4 µm. However, these sizes are exemplary and are not limiting on the present invention.

Generally, when pigmentary titanium dioxide in the rutile form is used the average crystal size is suitably from 0.1 µm to 0.4 µm and especially from 0.2 µm to 0.3 µm. When pigmentary titanium dioxide in the anatase form is used the average crystal size is suitably from 0.05 µm to 0.5 µm and especially from 0.1 µm to 0.35 µm.

When so-called "transparent" titanium dioxide is used it generally has an average primary particle size of from 0.01 µm to 0.15 µm. For "transparent" titanium dioxide, an average primary particle size within the range of from 0.01 µm to 0.03 µm can, for example, be used when the particles are substantially spherical, whilst for acicular particles, the average largest dimension of the primary particles can, for example, be within the range of from 0.02 µm to 0.1 µm. Again, these sizes are exemplary and are not limiting on the present invention.

As mentioned above, in one embodiment the particulate titania material for use in the method of the present invention has been coated with aluminum oxide. This may be alumina or hydrous alumina. It may be dense or non-dense.

In one embodiment, the particulate titania material that has been coated with aluminum oxide is pre-prepared and provided for use in the method of the present invention.

In another embodiment, the method of the present invention can include a step wherein uncoated particulate titania material is provided and is then coated with aluminum oxide. The treatment with a coating agent which is an alkylphosphonic acid or ester thereof can then be carried out.

Surface treatments of inorganic particles such as titania with inorganic oxides or hydrous oxides are well known in the art. Therefore, any suitable technique can be used in the step of coating the aluminum oxide onto the titania particles.

Generally, the amount of alumina coating that is coated onto the surface of the particulate titania material may range from 0.1% by weight to 1% by weight of the coating material relative to the total weight of the particulate titanium dioxide material. In one embodiment the amount is from 0.1% to 0.9%, such as from 0.1 to 0.8% or from 0.1 to 0.7%, by weight of the coating material relative to the total weight of the particulate titanium dioxide material. In an embodiment, the amount of alumina coating can, for example, be from 0.1% to 0.6%, such as from 0.2 to 0.6% or from 0.25 to 0.6%, by weight of the coating material relative to the total weight of the particulate titanium dioxide material.

Use of such levels of coating with aluminum oxide can be used to achieve pH levels for the titania of from 5 to 9. As can be seen in the Examples, it is beneficial when these pH levels are used. The highest levels of coating agent were seen to be attached for these embodiments.

Having lower amounts of $Al_2O_3$ in the coating gives lower evolution of volatiles. Thus when an alumina coating is used, the use of these amounts is beneficial in that not only are higher levels of coating agent attached, but additionally the treated particulate titanium dioxide as obtained can give rise to a low evolution of volatiles, e.g., as measured by lacing, when incorporated into a polymer composition.

Titania particles which have been coated with alumina can be obtained, or can be produced according to known techniques.

For example, the particulate titania can be coated with alumina through a wet coating process. Said wet coating process can comprise introducing an aqueous slurry comprising particles of titania into a tank for stirring. The aqueous slurry's temperature and/or pH may be suitable adjusted, for example the pH may be adjusted by adding sulfuric acid to the stirred tank. In a particular embodiment, sulfuric acid may be added over the required time to bring the pH to the appropriate value. The source of aluminum for the alumina coating may then be introduced into the stirred tank in an amount sufficient to produce the desired coating. Then the method may optionally include a step of filtering the slurry of titania particles, to provide a concentrated slurry, before the particles are dried. This optional step is suitably carried out before the titania is treated with the coating agent.

The step of drying the slurry to provide the dry particulate titania coated with the aluminum oxide may be carried out using conventional techniques, e.g., using an oven, calciner or other dryer.

The drying may be carried out at any suitable elevated temperature, e.g., at 50° C. or higher, such as 70° C. or higher, or 80° C. or higher, or 90° C. or higher, e.g., from 90° C. to 150° C. or from 100° C. to 120° C.

The drying may be carried out for any suitable length of time, e.g., for 30 minutes or more, such as 1 hour or more, 2 hours or more, 3 hours or more, e.g., from 1 hour to 10 hours or from 2 hours to 5 hours.

For example, an aqueous slurry comprising particles of titanium dioxide can be introduced into a tank for stirring. The aqueous slurry is treated by adding, to the stirred tank, caustic sodium aluminate over 25 minutes to bring the pH to 10.25, at which point the contents of the tank are mixed for 20 minutes. Thereafter, sulfuric acid can be added to the tank to adjust the pH to 6.5 to precipitate the aluminum oxide coating onto the titania particles.

In one embodiment the particulate titania can be coated with aluminum oxide through a dry coating process. This method has the advantage that it eliminates a number of energy consuming unit operations (the wet surface treatment step, filtration and washing, drying) thus greatly simplifying the coating process. In addition to process simplification there is a significant reduction in energy consumption with this process. In such dry coating process the particulate titania is subjected to an aluminum oxide treatment in a high pressure roller mill.

The aluminum oxide coating may be dense or non-dense. As the skilled person will appreciate, it is common for titanium dioxide to be milled, surface treated with alumina or hydrous alumina and then dried.

In one embodiment, particulate titania coated with alumina or hydrous alumina is used in the method of the present invention.

As mentioned above, in one embodiment the particulate titania material for use in the method of the present invention includes an excess of aluminum oxide within its crystal structure.

The use of alumina in excess of the amount required to compensate $Nb_2O_5$ within the crystal structure of the particulate titania is desirable because it has been found to improve the attachment of the alkylphosphonic acid or ester thereof coating agent onto the surface of the particles.

In one embodiment, the particulate titania material that has an excess of alumina is pre-prepared and provided for use in the method of the present invention.

In another embodiment, the method of the present invention can include a step wherein titania-containing slurry from the sulfate or chloride process is mixed with a material containing aluminum (e.g., an aqueous solution containing $Al^{3+}$) and this mixture is subjected to calcination or other reaction conditions so as to form titania particles whereby alumina is present within the crystal structure of the particulate titania, in excess of the amount required to compensate $Nb_2O_5$. The treatment with a coating agent which is an alkylphosphonic acid or ester thereof can then be carried out.

For example, titania-containing slurry from the sulfate process can be mixed with an aqueous solution of $Al_2O_3$, and this mixture can be subjected to calcination (e.g., at a ramp rate of 1° C. per minute) so as to form titania particles whereby aluminum oxide, in excess of the amount required to compensate $Nb_2O_5$, is present within the crystal structure of the particulate titania.

For the pigments derived from the chloride process, excess alumina can be added as aluminum trichloride to the slurry from the chloride process, and mixed with oxygen. The titanium present as titanium tetrachloride can then be oxidized to titanium dioxide in an oxidation reactor.

The crystal structure of the particulate titania contains alumina in excess of the amount required to compensate $Nb_2O_5$. The excess is the amount above that which is needed to have the same number of moles of Al atoms as Nb atoms in the particulate titanium dioxide sample. This excess alumina in the particulate titanium dioxide sample is then expressed as an amount of $Al_2O_3$ on a weight percentage basis with respect to $TiO_2$.

The excess amount of $Al_2O_3$— on a weight percentage basis with respect to $TiO_2$— within the crystal structure may suitably be 0.01% or more. The excess amount of this material within the crystal structure may, for example, range from 0.01% to 3%. In one embodiment the amount is from 0.01% to 2.5%, such as from 0.05% to 2.5% or from 0.05% to 2%. In one embodiment the amount is from 0.05% to 1.5%, such as from 0.1% to 1.5% or from 0.2% to 1.5%.

In an embodiment, the particulate titania material to be treated by the method of the present invention can, for example, have an excess of alumina of from 0.2% to 2%, such as from 0.25% to 2%, or from 0.2% to 1.5%, and especially from 0.25% to 1.5%.

Use of such levels of excess alumina can be used to achieve pH levels for the titania of from 5 to 9. It is significant that in the present invention these pH levels are used, as this assists the higher levels of coating agent to be attached.

It may be that the particulate titania material to be treated by the method of the present invention has an excess of alumina of from 0.3% to 2%, such as from 0.4% to 2% or from 0.5% to 2%, or from 0.3% to 1.5%, such as from 0.4% to 1.5% or from 0.5% to 1.5%.

The excess of alumina in the crystal structure may be in addition to the use of an alumina coating, or may be as an alternative to the use of an alumina coating.

Therefore, in one particular embodiment the method of the present invention comprises the use of particulate titania coated with aluminum oxide and having an excess of aluminum oxide in the crystal structure.

As noted, it can, in some embodiments, be desirable to achieve pH levels for the titania of from 5 to 9. If both a coating with aluminum oxide and an excess of aluminum oxide in the crystal structure are used in combination, the skilled person would appreciate that it may be possible to use amounts for each of these two alumina treatments that are towards the lower ends of the given ranges whilst still achieving these pH levels.

As already stated above, in the method of the present invention the particulate titania is treated with a coating agent which is an alkylphosphonic acid or an ester of an alkylphosphonic acid. This is applied to coat the particles, which are also micronized.

Generally, the amount of coating material is expressed in terms of the phosphorus content of the coated particles and is suitably in the range of from 0.05% to 1.0% phosphorus by weight with respect to $TiO_2$, e.g., from 0.1% to 0.8% or from 0.1% to 0.5%, such as from 0.1% to 0.4%, or from 0.1% to 0.3% phosphorus by weight with respect to $TiO_2$.

In one particular embodiment, the amount of coating agent is from 0.1% to 0.2%, such as from 0.1% to 0.15%, and especially from 0.12% to 0.15% phosphorus by weight with respect to $TiO_2$. These levels have been found to be particularly beneficial in terms of increasing the melt flow index for a polymer composition into which the particles are incorporated, without giving rise to considerable levels of off gassing.

Any process which produces a relatively uniform coating of the coating agent on the surface of the titania particles can be used to apply the coating.

One appropriate method is to apply the coating by spray drying the titania particles with the coating agent. Then the coated particles can be fed to the micronizer. Alternatively, or additionally, the coating agent may be applied to the particles in the micronizer, and this may be such that the coating is formed whilst the titania is being micronized.

Therefore, in one particular embodiment, the coating agent is added to the particles as a micronizer feed prior to and/or concurrent with steam micronization.

It has been determined by the present inventors that the steam micronization step acts to guarantee the attachment of the coating to the titania particles. Prior methods of treatment with alkylphosphonic acids have not recognized the importance of this step and the fact that, in combination with the presence of the inorganic oxide or hydrous oxide (as a coating and/or as an excess in the crystal structure), this leads to a significantly higher level of attachment of the coating material which in turn leads to improved properties when the treated titania is used in polymer compositions.

The coating agent used in the present invention is an alkylphosphonic acid or an ester thereof. This can be represented by the formula:

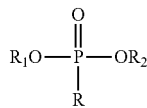

in which R is an alkyl group or a cycloalkyl group containing from 6 to 22 carbon atoms and $R_1$ and $R_2$ are each independently selected from hydrogen, an alkyl group, a cycloalkyl group, an aryl group and an aralkyl group, wherein the $R_1$ and $R_2$ groups each independently contain up to 16 carbon atoms.

Thus $R_1$ and $R_2$ are hydrogen or C1-C16 hydrocarbyl groups, wherein those hydrocarbyl groups are independently selected from alkyl groups, cycloalkyl groups, aryl groups and aralkyl groups. The skilled person will appreciate that when the hydrocarbyl group is cyclic, it must include a minimum of 3 carbon atoms, for example, a minimum of 5 carbon atoms. In particular, an alkyl group may have a minimum of 1 carbon atom, a cycloalkyl group may have a minimum of 5 carbon atoms, an aryl group may have a minimum of 6 carbon atoms and an aralkyl group may have a minimum of 6 carbon atoms.

R can, for example, contain from 6 to 20 carbon atoms or from 6 to 18 carbon atoms or from 6 to 16 carbon atoms or from 6 to 14 carbon atoms. It may be that R contains from 8 to 22 carbon atoms, such as from 8 to 20 carbon atoms or from 8 to 18 carbon atoms or from 8 to 16 carbon atoms or from 8 to 14 carbon atoms. R can, for example, contain from 8 to 12 carbon atoms, such as 8 or 9 or 10 carbon atoms.

It may be that the alkyl group or cycloalkyl group that is the R group is optionally substituted. For example, it may be substituted with one or more hydroxy, carbonyl or amino group. The substituent group or groups, when present, suitably provide no more than 6 carbon atoms, such as no more than 4 carbon atoms, e.g., no more than 2 carbon atoms. In another embodiment it is unsubstituted.

In an embodiment, R can, for example, be a straight chain alkyl group. However, branched chain alkyl groups are also suitable.

In another embodiment R is a cycloalkyl group, e.g., a cycloalkyl group having one or more 5- or 6-membered ring, such as two or more 5- or 6-membered rings. It may optionally be a terpenyl group, e.g., a monoterpenyl group, such as camphyl.

As the skilled reader will appreciate, when $R_1$ and $R_2$ are both hydrogen the above formula represents an alkylphosphonic acid.

In one embodiment $R_1$ and $R_2$ are both hydrogen and R is an alkyl group or a cycloalkyl group containing from 6 to 20 carbon atoms, such as from 6 to 18 carbon atoms or from 6 to 16 carbon atoms or from 6 to 14 carbon atoms. In one such embodiment R is an alkyl group or a cycloalkyl group containing from 8 to 20 carbon atoms, such as from 8 to 18 carbon atoms or from 8 to 16 carbon atoms or from 8 to 14 carbon atoms. In one such embodiment R is an alkyl group or a cycloalkyl group containing from 8 to 12 carbon atoms, such as 8 or 9 or 10 carbon atoms.

As the skilled reader will appreciate, when one or both of $R_1$ and $R_2$ is a hydrocarbyl group the formula represents an ester of an alkylphosphonic acid. In one embodiment only one of $R_1$ and $R_2$ is a hydrocarbyl group and the other is hydrogen. In another embodiment, both of $R_1$ and $R_2$ are hydrocarbyl groups.

The or each hydrocarbyl group may be, for example, independently selected from a C1-C16 alkyl group, a C5-C16 cycloalkyl group, a C6-C16 aryl group and a C6-C16 aralkyl group. In one embodiment, the or each hydrocarbyl group may be, for example, independently selected from a C1-C14 alkyl group, a C5-C14 cycloalkyl group, a C6-C14 aryl group and a C6-C14 aralkyl group. In another embodiment, the or each hydrocarbyl group may be, for example, independently selected from a C1-C12 alkyl group (such as a C2-C12 alkyl group), a C5-C12 cycloalkyl group, a C6-C12 aryl group and a C6-C12 aralkyl group. It may be that the or each hydrocarbyl group is independently selected from a C2-C10 alkyl group, a C5-C10 cycloalkyl group, a C6-C10 aryl group and a C6-C10 aralkyl group.

In the case of esters, $R_1$ and $R_2$ can, for example, each independently contain up to 10 carbon atoms, such as up to 8 carbon atoms (i.e., the ester is an ester of an alcohol containing up to 10 carbon atoms, and, for example, up to 8 carbon atoms, e.g., from 1 to 10 carbon atoms or from 2 to 8 carbon atoms). $R_1$ and $R_2$ can be different, but in one embodiment are the same.

In one embodiment $R_1$ and $R_2$ are hydrocarbyl groups, e.g., selected from C2-C10 alkyl groups, C5-C10 cycloalkyl groups, C6-10 aryl groups and C6-C10 aralkyl groups, and R is an alkyl group or a cycloalkyl group containing from 6 to 20 carbon atoms, such as from 6 to 18 carbon atoms or from 6 to 16 carbon atoms or from 6 to 14 carbon atoms. In one such embodiment R is an alkyl group or a cycloalkyl group containing from 8 to 20 carbon atoms, such as from 8 to 18 carbon atoms or from 8 to 16 carbon atoms or from 8 to 14 carbon atoms. In one such embodiment R is an alkyl group or a cycloalkyl group containing from 8 to 12 carbon atoms, such as 8 or 9 or 10 carbon atoms.

Suitable esters include, but are not limited to, ethyl esters, butyl esters, octyl esters, cyclohexyl esters and phenyl esters.

Coating agents for use in the present invention can, for example, include, but are not limited to, n-octylphosphonic acid and its esters, n-decylphosphonic acid and its esters, 2-ethylhexylphosphonic acid and its esters and camphyl phosphonic acid and its esters.

In general, the coating agent can be provided directly (if it is in liquid form), or it can be provided in solution in a suitable solvent, or it can be provided in emulsion form (e.g., it can be formed into an aqueous emulsion, by rapid stirring with water, if necessary in the presence of an emulsifier).

In one embodiment, the coating agent is applied in an aqueous liquid carrier; this may be water or an aqueous solution. Other polar carriers could also be contemplated, e.g., they may be selected from polar organic solvents or alcohols. The liquid carrier may also be a mixture of two or more carriers, e.g., it may be a mixture of water and alcohol.

In one embodiment, the coating agent is combined with a water/alcohol mixture (where the alcohol may be, for example, methanol, ethanol or isopropanol), and the resulting solution or emulsion is sprayed onto the particles before micronization and/or is added to the micronizer feed and/or is applied during the micronization process. Spray coating is of course a technique known in the art.

In an embodiment, the coating agent can, for example, be applied in an aqueous liquid carrier which is a mixture of water and alcohol, wherein the weight ratio of coating agent:alcohol:water is 80:10:10.

In the present method the particles are micronized in a steam micronizer. The steam micronization involves temperatures sufficient that the vapor exit temperature is 150° C. or higher.

In one embodiment the steam micronization involves temperatures sufficient that the vapor exit temperature is from 150° C. up to 350° C., e.g., from 150° C. up to 300° C., or from 150° C. up to 250° C., or from 150° C. up to 200° C.

The treated titania particles as obtained by the method of the present invention may have a pH from 5 to 9.

The treated titania particles as obtained by the method of the present invention can be used as filler or pigment materials in polymer compositions, such as masterbatches. For example, the method of the present invention can additionally comprise a further step where the treated titania is mixed with polymer.

These polymer compositions can be used to form polymer products, e.g., by extrusion, calendaring or molding. It may be that the polymer composition is initially formed and is then extruded, calendared, molded or otherwise formed into a polymer product. However, it is also within the scope of the present invention for the polymer composition to be formed at the same time as it is extruded, calendared, molded or otherwise formed into a polymer product.

In this regard, the treated titania and the polymer could, for example, be mixed before compounding or extruding or molding, but alternatively they can also be separately added to a compounder, extruder or molding machine and the mixing of the two materials occurs in the machine. Typical machines that could be used include Banbury mixers, single and twin screw extruders and hybrid continuous mixers. When the ingredients are separately added to the machine they may be initially mixed within the machine in, for example, a screw feeder. The heat within the machine, which is usually generated by the energy of mixing, causes the polymer to melt and allows intimate mixing of polymer and the titania particles. The temperature at which the machine operates can vary: for example, Banbury mixers typically operate at temperatures from 100° C. to 200° C. and twin screw mixers typically operate from 150° C. to 300° C.

The proportion of treated titania used in the polymer composition depends upon the intended use for the composition.

Generally, a masterbatch containing pigmentary titania could comprise 40% to 80% by weight of titania, e.g., from 50% to 75% by weight. Masterbatches containing "transparent" titanium dioxide having an average particle size in the range 0.01 µm to 0.1 µm generally contain less inorganic solid; typically the amount present is from 5% to 40% by weight, e.g., from 10% to 20% by weight.

The polymer to be used is not particularly limited. A range of polymers are known to the skilled reader as being suitable for use in polymeric compositions, including but not limited to, polyolefins, PVC, styrenic polymers such as polystyrene and acrylonitrile-butadiene-styrene polymers, polyamides, polycarbonates and polyesters. In one embodiment the polymer is a polyolefin such as polyethylene or polypropylene.

The polymer compositions (e.g., masterbatches) comprising the treated titania can additionally comprise other compounds and additives as known in the art, such as one or more of: plasticizers, antioxidants, light stabilizers and catalyst neutralizers. Additional pigments and/or fillers may be present in addition to the titania.

The present invention will now be further described, in a non-limiting manner, by reference to the following examples.

EXAMPLES

Example 1: Effect of $Al_2O_3$ Coating on Titanium Dioxide Particles

Dry titanium dioxide samples were obtained from the sulfate process. Some of these were uncoated (samples 1-3), some were coated with alumina at levels of 0.5 wt % with respect to the titania (samples 4-6) and one was coated with alumina at a level of 4 wt % with respect to the titania (sample 7). The titania did not include excess alumina in the crystal structure.

The average particle size of the titanium dioxide was in the range of from 0.25 µm to 0.3 µm.

The alumina coating was achieved by adding caustic sodium aluminate over 25 minutes to bring the pH to 10.25, whereupon it was mixed for 20 minutes. Finally, the pH was adjusted to 6.5 by addition of sulfuric acid.

Each of the samples was spray coated with octylphosphonic acid at different levels. The octylphosphonic acid was provided in an aqueous liquid carrier which is a mixture of water and alcohol, wherein the weight ratio of coating agent:alcohol:water is 80:10:10.

After this step the particles were steam micronized in a micronizer with an exit temperature of 150° C.

To determine the amount of octylphosphonic acid attached to each sample, extraction tests were performed in ethanol to determine the amount of acid which had not become bound to the surface.

The results are shown in Table 1.

TABLE 1

| Sample | wt % coated $Al_2O_3$ | wt % excess $Al_2O_3$ | % added OPA (P by weight on $TiO_2$) | % loss of OPA on extraction |
|---|---|---|---|---|
| 1 | 0 | 0 | 0.16 | 25 |
| 2 | 0 | 0 | 0.32 | 30 |
| 3 | 0 | 0 | 0.48 | 41 |
| 4 | 0.5 | 0 | 0.16 | 2 |
| 5 | 0.5 | 0 | 0.26 | 0 |
| 6 | 0.5 | 0 | 0.38 | 10 |
| 7 | 4 | 0 | 0.64 | 0 |

It can be seen that for those titanium particles that had no alumina coating and no excess alumina in the crystal structure (samples 1-3), there was in each case a loss of octylphosphonic acid on extraction, showing that no all of the coating agent had attached to the particles. The percentage lost on extraction was generally higher for the samples with more octylphosphonic acid added.

It can be seen that, in contrast, for those titanium particles that had an alumina coating added (at 0.5 wt % or 4 wt %) before the particles were treated with octylphosphonic acid, significantly less octylphosphonic acid was lost on extraction. This shows that a greater proportion of the octylphosphonic acid coating agent was successfully attached to the particles as a coating when there was this alumina coating pre-treatment.

A comparison of sample 1, where there was no coating, with sample 4, where the titanium particles had an alumina coating added at 0.5 wt % before the particles were treated with octylphosphonic acid, shows that although the same addition level of octylphosphonic acid was used (0.16 wt % P by weight on $TiO_2$), for the uncoated product there was a 25% loss on extraction, compared to a 2% loss for the coated product, showing that a significantly greater proportion of the coating agent as added had become attached to the particles.

It can be seen that for a product with a 4 wt % alumina coating, a high addition level of octylphosphonic acid can be used (as P by weight on $TiO_2$) with no loss on extraction, showing that all of that coating agent was fully attached.

Thus the alumina coating increases the amount of alkylphosphonic acid that can be successfully bound to the titanium dioxide particles.

Example 2: Effect of $Al_2O_3$ Excess Added to the Titanium Dioxide Particles Dry titanium dioxide samples were obtained. Samples 8-9 were obtained from the sulfate production process for $TiO_2$ and samples 10-12 were obtained from the chloride production process for $TiO_2$.

The average particle size of the titanium dioxide was in the range of from 0.25 μm to 0.3 μm.

The alumina and niobia levels in each of these samples were obtained using x-ray fluorescence. The amount of alumina in excess of that required to compensate for the niobia present was calculated. Each sample included excess alumina, at a range of different levels.

For the pigments derived from the sulfate process the varying levels of alumina were achieved by adding different amounts of aluminum-containing solution to the titania containing slurry obtained from after the precipitation stage in the sulfate. Each slurry was calcined in a rotary calciner at a ramp rate of 1° C./minute to a temperature at which the rutile content was greater than 95%.

For the pigments derived from the chloride process the excess alumina was added as aluminum trichloride, mixed with oxygen, and titanium (as the titanium tetrachloride) was oxidized to titanium dioxide in an oxidation reactor.

Each of the samples was spray coated with octylphosphonic acid at a level of 0.14% phosphorus by weight with respect to titanium dioxide. The octylphosphonic acid was provided in an aqueous liquid carrier which is a mixture of water and alcohol, wherein the weight ratio of coating agent:alcohol:water is 80:10:10.

After this step the particles were steam micronized in a micronizer with an exit temperature of 150° C.

For each sample the pH was measured after this treatment. The results are shown in Table 2. It can be seen that the higher levels of excess alumina in the crystal structure led to a higher pH for the particles.

TABLE 2

| Sample | Total $Al_2O_3$ (wt %) | wt % excess $Al_2O_3$ | pH |
|---|---|---|---|
| 8 | 0.12 | 0.02 | 3.5 |
| 9 | 0.26 | 0.16 | 3.2 |
| 10 | 0.18 | 0.18 | 5.0 |
| 11 | 0.26 | 0.26 | 6.1 |
| 12 | 1.18 | 1.18 | 6.2 |

Note: samples 10-12 have <0.01% $Nb_2O_5$, and therefore substantially zero $Al_2O_3$ is needed to compensate $Nb_2O_5$; thus in these samples the values for Total $Al_2O_3$ and excess $Al_2O_3$ appear identical.

$^{31}P$ solid state NMR analysis was carried out to determine the extent to which the octylphosphonic acid was attached to each sample.

The NMR analysis showed that the free acid peak at 37 ppm reduces from sample 8 to sample 9 and even more significantly for sample 10, as the excess alumina level in the titanium dioxide particles is increased. The peak then disappears for samples 11 and 12, which are the samples with the highest levels of excess alumina level in the titanium dioxide particles.

It is notable that the best results, in terms of there being only a small free acid peak or no free acid peak, are those where the pH of the titania particles was 5 or more. These are the samples where the best attachment levels of coating agent were achieved.

This indicates that as the level of alumina excess in the particles is increased, more octylphosphonic acid can be reacted onto the surface, leaving no excess acid behind.

Thus the alumina excess in the crystals increases the amount of alkylphosphonic acid that can be successfully bound to the titanium dioxide particles.

Example 3: Effect of $Al_2O_3$ Excess and Amount of Octyl Phosphonic Acid

Dry titanium dioxide samples were obtained. These samples were produced using the sulfate process for $TiO_2$.

The average particle size of the titanium dioxide was in the range of from 0.25 μm to 0.3 μm.

The alumina and niobia levels in each of these samples these samples were obtained using x-ray fluorescence. The amount of alumina in excess of that required to compensate for the niobia present was calculated. Each sample included excess alumina, at a range of different levels.

The varying levels of alumina were achieved by adding different amounts of aluminum-containing solution to the titania containing slurry obtained from after the precipitation stage in the sulfate. Each slurry was calcined in a rotary calciner at a ramp rate of 1° C./minute to a temperature at which the rutile content was greater than 95 wt %.

Each of the samples was spray coated with octylphosphonic acid at different levels. The octylphosphonic acid was provided in an aqueous liquid carrier which is a mixture of water and alcohol, wherein the weight ratio of coating agent:alcohol:water is 80:10:10.

After this step the particles were steam micronized in a micronizer with an exit temperature of 150° C.

For each sample the pH was measured. The results are shown in Table 3.

TABLE 3

| Sample | Total Al$_2$O$_3$ (wt %) | wt % excess Al$_2$O$_3$ | Added OPA (% P by weight on TiO$_2$) | pH |
|---|---|---|---|---|
| 13 | 0.27 | 0.18 | 0.10 | 3.96 |
| 14 | 0.27 | 0.18 | 0.12 | 3.11 |
| 15 | 0.27 | 0.18 | 0.14 | 3.06 |
| 16 | 0.27 | 0.18 | 0.15 | 3.01 |
| 17 | 0.34 | 0.34 | 0.10 | 6.15 |
| 18 | 0.34 | 0.34 | 0.12 | 5.89 |
| 19 | 0.34 | 0.34 | 0.14 | 5.46 |
| 20 | 0.34 | 0.34 | 0.15 | 5.08 |

Note: samples 17-20 have <0.01% Nb$_2$O$_5$, and therefore substantially zero Al$_2$O$_3$ is needed to compensate Nb$_2$O$_5$ thus in these samples the values for Total Al$_2$O$_3$ and excess Al$_2$O$_3$ appear identical.

It can be seen that for the same amount of added OPA (0.10, 0.12, 0.14 or 0.15 respectively) the pH of the particles was higher for the sample with 0.34% excess alumina than for the sample with 0.18% alumina.

This confirms that higher levels of excess alumina in the crystal structure leads to a higher pH for the particles, and therefore, as in Example 2, more octylphosphonic acid can be reacted onto the surface. As noted in Example 2, particularly excellent results are achieved when the pH is 5 or more.

Example 4: Effect of Different Titanium Dioxide Particles with Excess of Al$_2$O$_3$ Titanium dioxide samples were prepared by adding aluminum, phosphate and alkali metal containing solutions to a titania containing slurry. The slurry was obtained from after the precipitation stage in the sulfate process. Each slurry was calcined in a rotary calciner at a ramp rate of 1° C./minute to a temperature at which the rutile content was greater than 95%.

The % rutile was recorded for each sample, together with the wt % levels (with respect to the titania particle) of P$_2$O$_5$, K$_2$O, Na$_2$O and total Al$_2$O$_3$. The amount of niobia was also measured and the amount of alumina in excess of that required to compensate for the niobia present was also calculated (in the manner described above in the Summary). The total and excess alumina results were obtained from x-ray fluorescence measurements.

The average particle size of the titanium dioxide was in the range of from 0.25 to 0.3 μm.

Each of the samples was spray coated with octylphosphonic acid at a level of 0.14% phosphorus by weight with respect to titanium dioxide. The octylphosphonic acid was provided in an aqueous liquid carrier which is a mixture of water and alcohol, wherein the weight ratio of coating agent:alcohol:water is 80:10:10.

After this step the particles were steam micronized in a micronizer with an exit temperature of 150° C.

For each sample the pH was measured. The results are shown in Table 4.

TABLE 4

| Sample | wt % rutile | wt % P$_2$O$_5$ | wt % K$_2$O | wt % Na$_2$O | wt % total Al$_2$O$_3$ | wt % excess Al$_2$O$_3$ | pH |
|---|---|---|---|---|---|---|---|
| 21 | 99.9 | 0.2 | 0.1 | 0.08 | 0.15 | 0.07 | 3.7 |
| 22 | 98.4 | 0.2 | 0.1 | 0.08 | 0.35 | 0.27 | 5.2 |
| 23 | 95.3 | 0.2 | 0.1 | 0.08 | 0.55 | 0.47 | 5.5 |
| 24 | 97.2 | 0.13 | 0.1 | 0.08 | 0.75 | 0.67 | 6.2 |
| 25 | 98.3 | 0.13 | 0.1 | 0.08 | 1.00 | 0.92 | 6.2 |

This confirms that the higher levels of excess alumina in the crystal structure led to a higher pH for the particles, and therefore, as in Example 2, more octylphosphonic acid can be reacted onto the surface. As noted in Example 2, particularly excellent results are achieved when the pH is 5 or more.

Example 5: Optimum Level of Octylphosphonic Acid

Dry titanium dioxide samples were obtained from the sulfate process. The amount of alumina in excess of that required to compensate for the niobia present was calculated and each included excess alumina in the crystal structure, at a level of 0.05 mol %.

The excess level of alumina was firstly achieved by adding an appropriate amount of aluminum-containing solution to the titania containing slurry obtained from after the precipitation stage in the sulfate. The slurry was calcined in a rotary calciner at a ramp rate of 1° C./minute to a temperature at which the rutile content was greater than 95%.

Each sample had further alumina added as an alumina coating at a 0.5 wt % level. The alumina coating was achieved by adding caustic sodium aluminate over 25 minutes to bring the pH to 10.25, whereupon it was mixed for 20 minutes. Finally, the pH was adjusted to 6.5 by addition of sulfuric acid.

The average particle size of the titanium dioxide was in the range of from 0.25 μm and 0.3 μm.

Each of the samples was spray coated with octylphosphonic acid at different levels. The octylphosphonic acid was provided in an aqueous liquid carrier which is a mixture of water and alcohol, wherein the weight ratio of coating agent:alcohol:water is 80:10:10.

After this step the particles were steam micronized in a micronizer with an exit temperature of 150° C.

The samples were then each compounded at 60% in LVP2201 polyethylene using a twin screw extruder to form polymer compositions. A Melt Flow Indexer was used to measure the melt flow index (MFI) for each polymer composition.

The results are shown in Table 5.

TABLE 5

| Sample | wt % coated Al$_2$O$_3$ | wt % excess Al$_2$O$_3$ | Added OPA (P by weight on TiO$_2$) | MFI |
|---|---|---|---|---|
| 26 | 0.5 | 0.05 | 0.12 | 11.18 |
| 27 | 0.5 | 0.05 | 0.128 | 11.83 |
| 28 | 0.5 | 0.05 | 0.136 | 12.51 |
| 29 | 0.5 | 0.05 | 0.144 | 11.87 |
| 30 | 0.5 | 0.05 | 0.152 | 12.33 |
| 31 | 0.5 | 0.05 | 0.160 | 11.37 |
| 32 | 0.5 | 0.05 | 0.168 | 12.12 |
| 33 | 0.5 | 0.05 | 0.176 | 12.67 |

It can be seen that as the level of octyl phosphonic acid is increased from 0.12 to 0.136 the melt flow index also increases.

Above 0.136% added octyl phosphonic acid the results obtained proved to be more erratic, however, although there was still a good MFI.

Additions of over 0.144% P led to increased levels of off gassing, which is undesirable.

Therefore the optimum level of octylphosphonic acid addition is from about 0.1 to 0.15%, and, for example, from 0.12 to 0.15%, as measured with respect to the amount of phosphorus by weight with respect to titanium dioxide.

Example 6: Lacing Performance

A titanium dioxide sample was prepared in a full scale plant sulfate process.

The production involved adding an alumina solution to a titania containing slurry prior to calcination. The amount of alumina added provided excess alumina in the calcined sample (alumina in excess of that required to compensate for the niobia present on the sample) of around 0.25% $Al_2O_3$ on $TiO_2$ on a weight basis. The calciner discharge was then processed through a high pressure roller mill at a pressure of $13.5 \times 10^{-14}$ $Nmm^{-2}$.

The average particle size of the titanium dioxide was in the range of from 0.25 μm to 0.3 μm.

The roller mill discharge was processed through a steam micronizer with an exit temperature of 150° C. Octylphosphonic acid was added during the micronization process, with a target addition level of 0.89% octylphosphonic acid.

The thus obtained titanium dioxide particles (sample 34) were blended with polyethylene at a level of 25 w/w % and were extruded at different die temperatures, using a HAAKE Polydrive Rheometer plus a Rheomex 252P extruder, to form extruded films. The extruded films had a target width of 40 mm and a target film thickness of 160 μm.

A second batch of titanium dioxide particles (sample 35) was obtained by the same process, but a coating of hydrous alumina was added by wet coating with subsequent filtration and drying, prior to micronizing with octylphosphonic acid. The alumina coating was achieved by adding caustic sodium aluminate over 25 minutes to bring the pH to 10.25, whereupon it was mixed for 20 minutes. Finally, the pH was adjusted to 6.5 by addition of sulfuric acid.

As a comparison, comparative polyethylene films were made using commercially available titanium dioxide particles (Comp 1, 2 and 3). These had mean particle sizes in the range of from 0.25 μm and 0.3 μm and were pigmentary particles which were designed for use in plastics applications.

The lacing performance was then evaluated for each film. The lacing rating is a measure of volatile evolution during high temperature extrusion. The extruded films were rated by visual comparison on a light box with a set of standards. As the skilled person will understand, a higher value indicates more lacing has occurred.

The results are set out in Table 6.

TABLE 6

| Temperature of Die (° C.) | Sample 34 | 35 | Comp 1 | Comp 2 | Comp 3 |
|---|---|---|---|---|---|
| 260 |  |  |  | 3 | 2.5 |
| 282 | 2 | 2 | 11 | 4 | 3 |
| 300 | 2.5 | 5 |  | 9 | 3.5 |
| 310 | 5 | 9 |  | 10 |  |
| 320 | 7 | 10 |  | 14 |  |
| 330 | 11 | 14 |  |  |  |

It can therefore be seen that there is a benefit to preparing the particles via a method in which there is no wet treatment step, as there are better lacing results (lower values) for Sample 34 as compared to Sample 35.

The present invention is not limited to embodiments described herein; reference should be had to the appended claims.

What is claimed is:

1. A method of treating particulate titanium dioxide, the method comprising:
   i) providing the particulate titanium dioxide comprising a crystal structure, wherein the particulate titanium dioxide comprises aluminum oxide within the crystal structure in a molar excess of an amount required to compensate any $Nb_2O_5$ in the crystal structure; and then
   ii) treating the particulate titanium dioxide by adding a coating agent that is an alkylphosphonic acid or an ester thereof, the alkylphosphonic acid comprising a $C_6$-$C_{22}$ alkyl group, and steam micronizing the particulate titanium dioxide with a steam micronizer so that a vapor exit temperature from the steam micronizer is 150° C. or higher, so as to obtain a micronized particulate titanium dioxide that is provided with the coating agent at an outer surface, wherein,
   the molar excess of the aluminum oxide in the crystal structure of the particulate titanium dioxide to be treated is from 0.2% to 2% on a molar basis.

2. The method as recited in claim 1, wherein the method does not include a coating step of an aluminum oxide coating.

3. The method as recited in claim 1, wherein the particulate titanium dioxide in step i) has a pH of from 5 to 9.

4. The method as recited in claim 1, wherein the coating agent is added in an amount of from 0.1% to 0.2%, when measured as an amount of phosphorus by weight with respect to $TiO_2$.

5. The method as recited in claim 4, wherein the coating agent is added in an amount of from 0.12% to 0.15%, when measured as the amount of phosphorus by weight with respect to $TiO_2$.

6. The method as recited in claim 1, wherein,
   the treating by adding the coating agent in step ii) is started prior to the steam micronizing, and continues during some or all of the steam micronizing, or
   the treating by adding the coating agent in step ii) does not start prior to the steam micronizing, and only occurs during some or all of the steam micronizing.

7. The method as recited in claim 1, wherein the particulate titanium dioxide includes within the crystal structure aluminum oxide in the molar excess of the amount required to compensate any $Nb_2O_5$ in the crystal structure.

8. The method as recited in claim 7, wherein the particulate titanium dioxide to be treated does not comprise the aluminum oxide coating.

9. The method as recited in claim 7, wherein the method does not comprise a wet treatment step.

10. The method as recited in claim 7, wherein the treating by adding the coating agent in step ii) does not start prior to the steam micronizing, and only occurs during some or all of the steam micronizing.

11. The method as recited in claim 1, wherein the method does not include at least one of a filtration step, a washing step, and a drying step.

12. The method as recited in claim 1, wherein the particulate titanium dioxide was manufactured via the chloride process.

13. A treated particulate titanium dioxide produced via the method as recited in claim 1.

14. A method of preparing a polymeric composition, the method comprising:
   providing the treated particulate titanium dioxide as recited in claim 13; and then
   mixing the treated particulate titanium dioxide with a polymer.

15. A polymeric composition produced via the method as recited in claim 14.

16. A method of producing a polymer product, the method comprising:
   providing the polymeric composition as recited in claim 15; and
   calendaring or extruding or molding the polymeric composition to form the polymer product.

17. A polymer product produced via the method as recited in claim 16.

* * * * *